United States Patent [19]

Ravinale et al.

[11] Patent Number: 4,548,518
[45] Date of Patent: Oct. 22, 1985

[54] ISOSTATIC DEVICE TO PROVIDE ROLLING AND SUPPORT WITH REVOLVABLE BODIES, SUCH AS A ROTATABLE RING

[75] Inventors: Stefano Ravinale, Sesto S. Giovanni; Vittorio Vernocchi, Imola, both of Italy

[73] Assignees: Officine Savio SpA, Pordenone; Fag Italiana SpA, Naples, both of Italy

[21] Appl. No.: 563,565

[22] Filed: Dec. 20, 1983

[30] Foreign Application Priority Data

Dec. 23, 1982 [IT] Italy ............................. 83506 A/82

[51] Int. Cl.⁴ .................... F16C 19/04; F16C 33/10; F16C 33/58; D01H 7/56
[52] U.S. Cl. ................................. 384/490; 57/124; 384/469; 384/513; 384/536
[58] Field of Search .................. 57/122, 123, 124; 308/184 R, 187, 189 R, 189 A, 207 A, 236, 235; 384/490, 491, 469, 513, 535, 536, 581, 582

[56] References Cited

U.S. PATENT DOCUMENTS

| | | | |
|---|---|---|---|
| 1,160,594 | 11/1915 | Graham | 308/207 A |
| 2,034,762 | 3/1936 | Kuwada | 57/124 X |
| 2,563,187 | 8/1951 | Pennati | 57/124 |
| 2,932,152 | 4/1960 | Jackson | 57/124 X |
| 3,628,836 | 12/1971 | Mulready | 308/184 R |
| 3,976,340 | 8/1976 | Pitner | 308/184 R |
| 4,357,791 | 11/1982 | Hope, Sr. et al. | 57/122 |

FOREIGN PATENT DOCUMENTS

| | | | |
|---|---|---|---|
| 26161 | 4/1981 | European Pat. Off. | 57/124 |
| 178323 | 2/1962 | Sweden | 308/236 |
| 572597 | 9/1977 | U.S.S.R. | 308/236 |

Primary Examiner—Stuart S. Levy
Assistant Examiner—Thomas R. Hannon
Attorney, Agent, or Firm—Wegner & Bretschneider

[57] ABSTRACT

This invention concerns an isostatic device (10) to provide rolling and support with revolvable bodies which comprises an inner ring (12), an outer ring (11), a cage (13) and three revolvable bodies (14) fitted substantially at angles of one hundred and twenty degrees from each other, in which device (10) the revolvable bodies (14) are kept in position by the cage (13), the mean circumference of which is offset in relation to the median circumference of rolling of the revolvable bodies (14), and one ring is substantially stiff and the other ring is resilient with a suitable degree of contact with the revolvable bodies (14) so that, after being fitted, the resilient ring tends to take up a three-lobed conformation, thus providing a pre-set pre-load for the revolvable bodies (14).

The invention also concerns a device which has adjustable braking means and which can be used as a rotatable ring.

15 Claims, 16 Drawing Figures

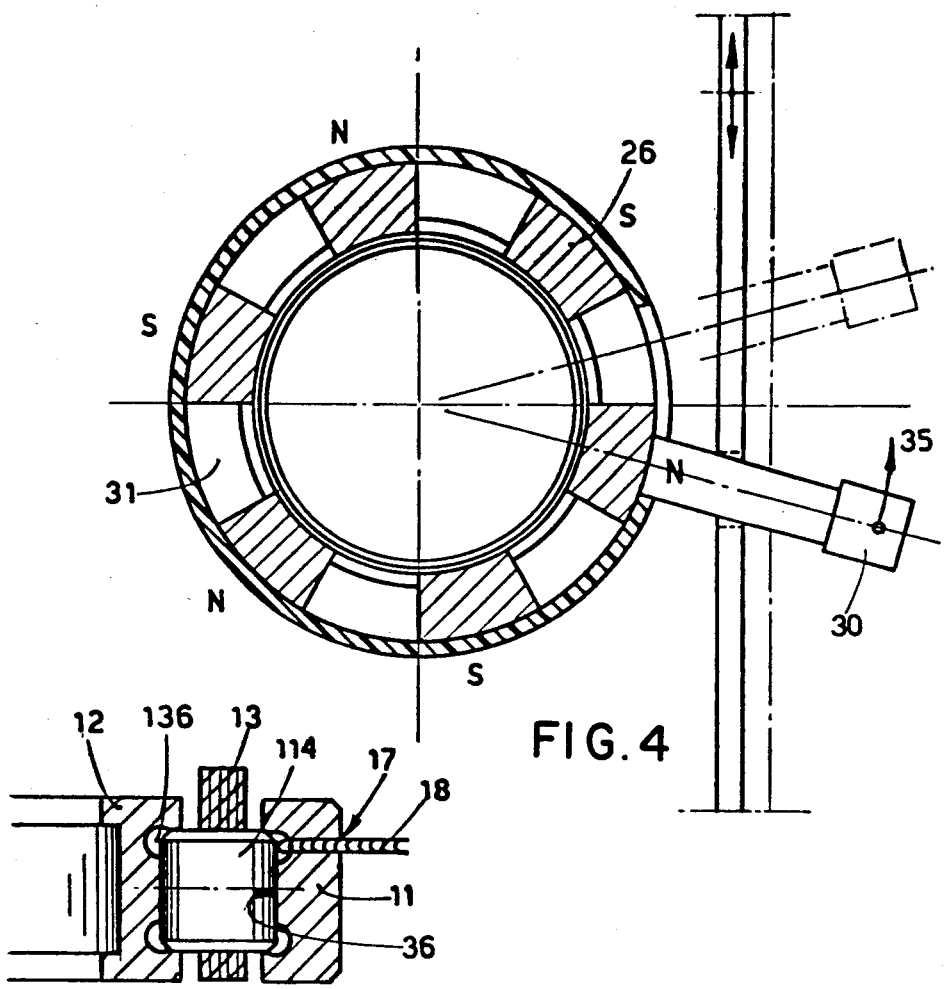
FIG. 4
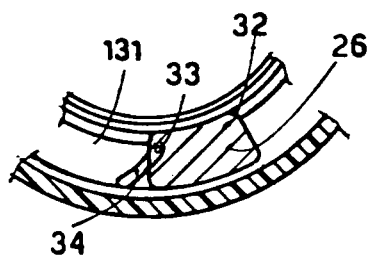
FIG. 1b
FIG. 5

ISOSTATIC DEVICE TO PROVIDE ROLLING AND SUPPORT WITH REVOLVABLE BODIES, SUCH AS A ROTATABLE RING

This invention concerns devices to provide rolling and support which are employed as rotatable rings in spinning operations.

To be more exact, the invention concerns a rotatable ring which comprises as a support an isostatic bearing with revolvable bodies; the bearing is isostatic as it consists of only the number of components enough and necessary to ensure functioning and the precise determination of constrained reactions in terms of magnitude and point of application.

Rotatable rings are known in the art which have a supporting device consisting of a ball-bearing and which consist of a pair of concentric rings between which a given number of balls is interposed.

It is also known that in normal bearings with revolvable bodies, whether they be balls or rollers, the load capacity depends on the number of revolvable bodies since the stresses applied are transmitted by contact between the bodies and the races.

As every revolvable body is equivalent to a constraint, the number of constrained reactions is usually much greater than the number of reactions strictly needed for such a system to be determined statically, that is to say, the structure is hyperstatic and not isostatic.

The invention in question is a bearing with only three revolvable bodies, which is therefore equivalent to the one single isostatic structure that can be embodied with a device to provide rolling.

The constrained reactions are not only determined but are exactly the same with any load and in any working condition.

So as to obtain an even distribution of loads in every working condition and to eliminate radial and axial play and to increase the stiffness of the rotatable structure, the bearings are sometimes preloaded when they are being fitted.

However, it is known that the greater the number of revolvable bodies employed, the greater the capacity to withstand external loads, but the harder it is to obtain the ability to preload.

When bearings are not preloaded enough, in transient conditions of start-up and braking and in all conditions when there is not steady running the increases and decreases of speed of the ring in motion are transmitted to the balls themselves with a rolling motion that is not pure, and lead to slipping movements, which change momentarily in a dissimilar way the motion of the devices fitted with such bearings and which always generate wear and overheating and damaging disturbances.

Transient phenomena may have a scant or no importance when there is only one device, but become very important when there is a plurality of devices subject to a centralized control and when such devices have to work at the same speed and in a fully synchronous manner.

This invention is put forward to obviate the foregoing drawbacks and envisages a new isostatic bearing to provide rolling and support with revolvable bodies and to be applied as a spinning ring without such an application being deemed to be restrictive.

It is also known that, if it is wished to convert roving into yarn with the ring spinning process, it is necessary to give the yarn a tension required for the winding by means of a suitable load.

As is known, if static rings are used for spinning, travellers are employed which obtain the right position for the yarn to be wound onto the bobbin.

A traveller of a suitable weight is used for each kind of yarn so as to determine on the yarn itself the exact tension on the yarn being formed.

Rotatable rings have also been disclosed (EP-A-0026161) which are fitted to bearings and provide a fixed brake which cooperates by sliding on the rotatable part of the bearing or on the cage that holds the balls; but when such bearings are fitted as components of rotatable spinning rings, they have given unsatisfactory results.

A magnetic brake (EP-A-0026161) or an eddy-current brake (DE-A-2538420) has also been disclosed which exerts its action on the rotatable part, perhaps with the help of mechanical action.

During experimental trials such embodiments too gave unsatisfactory results, above all in conjunction with transient periods and in connection with the processing of given yarns.

This aspect too is tackled by our invention in a new and original way and the results obtained are as good as can be expected in every phase of spinning and with any yarn.

The invention envisages an isostatic bearing to provide rolling and support which is equipped with only three revolvable bodies arranged with one hundred and twenty degrees between them and kept in this geometric position by a one-piece cage made of a non-metallic material.

A sleeve bearing a small ring is fitted to the inner ring of the bearing, a resilient brake means being interposed and also acting to absorb vibrations, the functioning being unlike the teaching of U.S. Pat. No. 4,357,791, which discloses static elements having the functions only of damping vibrations and of reducing noise.

The inner and outer rings which form such a bearing are made of steel and, if the revolvable bodies are balls, are shaped in such a way that they both comprise a groove having the profile of a circular sector with a radius of curvature slightly greater than the radius of the balls employed.

If rollers are used, then the shape of the rings is congruent with the shape of the rollers.

This bearing is therefore suitable for withstanding axial and radial loads and can be employed with a horizontal or vertical axis.

So as to enable desired and accurate rolling to be obtained in every condition of motion, whether accelerating or slowing down or steady running, this type of bearing is provided with a heavy preloading without its working life being impaired or altered thereby.

So as to obtain such a preloading, it is arranged that one of the rings (either the outer or the inner one) is very stiff and can be deemed not capable of deformation in practice in the example under consideration, whereas the other ring, although having a section with a high moment of inertia which enables it to withstand the loads required, can be readily deformed owing to its circumferential slenderness.

The stiff ring can have any section provided that its race has the right section and a suitable surface.

The other ring, which we shall call elastic herein, has to comprise a suitably cut race but also has to have a suitable section which permits a suitable degree of deformation of the circumference through geometric contact. The section of this elastic ring can be C-shaped or can have other shapes suitable for the purpose.

For the sake of simplicity we shall deal hereinafter with the C-shaped section alone but shall assume that any other section which may meet our purpose is comprised.

The C-shaped section has to ensure enough crosswise stiffness to prevent warping and any crosswise deformation. At the same time it has to permit elastic circumferential deformations due to its contact with the revolvable bodies, which are always kept under load in this way.

The elastic ring will be the inner one advantageously if it is employed as a rotatable ring. When the elastic ring is the inner one, the circumference of contact (between the race and the revolvable bodies) of the inner elastic ring will be greater than the nominal geometric dimension so that a certain desired degree of interference takes place. The ring will therefore become deformed and will deviate from its pure circumference so as to take up a substantially three-lobed configuration.

This deformation of the ring will generate on it stresses which will be transmitted to the revolvable bodies either as an increase of the elastic impression between the revolvable body and outer ring and between the revolvable body and inner ring (an increase of the ellipses of contact) or as a permanent load.

The friction between the revolvable bodies and the rings will be proportional to the value of the load, with the consequent advantage that transient motions will always take place during rolling without slipping movements.

Such a condition also entails a certain resisting moment, which may be necessary in given cases, just as in fact it is in an application such as a spinning ring.

The cage which keeps the balls positioned geometrically as required at angles of one hundred and twenty degrees consists substantially of a ring with a suitable section, rectangular for instance, and with sizes such as will contain a hole having a diameter greater than the diameter of the ball and having outer and inner diameters such as can be contained in the free space remaining between the races of the bearing.

The diameters of the cage are such as to obtain asymmetry, that is to say, the mean circumference of the cage does not coincide with the circumference on which the balls lie but is offset towards the movable ring. The purpose of this is that the inevitable eccentric positioning of the cage during running will be of the minimum possible value (small gap between the cage and the inner ring).

So that the overall geometric positioning will be stable in the long term, it is very important that the cage should not be capable of deformation and should be not very sensitive to sudden changes of temperature.

For instance, a suitable material for construction of the cage is a thermosetting resin reinforced with fibres or wood and perhaps having a certain porosity, which is a property that can be exploited to impregnate the cage with lubricant and thus to provide the device with an efficient lubrication system.

The teaching of U.S. Pat. No. 877,491 is known but concerns another type of ring with different problems.

Lubrication of the bearing has been purposely studied so as to achieve minimal lubrication.

One embodiment envisages that a wool thread acting as a wick to deliver lubricant is stretched between two holes made in the static ring for this purpose. This wick reaches into an oil bath and becomes impregnated by capillary action.

The tract of the wick stretched between the two holes contacts the cage, and the rubbing of the cage against the wick causes oil to be taken from the wick, and this oil returns once again to the oil bath by capillary action. This phenomenon sets in motion and makes possible a continuous delivery of lubricant even though in a minimum quantity.

Even if the flow of this continuous delivery of oil is very small, yet it is enough to ensure delivery of lubricant needed for the zones of contact between the revolvable bodies and the races, for it is known that, to enable rolling to take place in the best conditions for working and for a maximum life, it is necessary that the rolling should be carried on in conditions of the least friction at a low temperature; these conditions are brought about only with a minimum flow of enough lubricant.

Another embodiment, which can be employed more advantageously with revolvable bodies consisting of rollers, envisages that the feeder wick cooperates with a zone of the race, or a zone very close to the rolling race, which does not cooperate with the revolvable body.

As we said earlier, it is known that, to convert roving into yarn with the ring spinning process, the yarn has to be given a tension needed for the winding through a suitable load.

It is also known that, if static rings are used in spinning, travellers are employed which govern the position of winding the yarn on the bobbin, and a traveller of a suitable weight for each type of yarn is employed to determine on the yarn itself the right tension on the yarn being formed.

The invention provides regulation of the tensioning load with an auxiliary device which comprises a certain number of permanent magnets or electromagnets. These magnets can be disposed with concordant polarities or alternate polarities (and are then always in an even number).

According to the invention the magnets are arranged advantageously with alternate polarities and thus bring about a continuous magnetic field that ensures efficient and even braking action, which would otherwise not be possible with a lay-out of concordant polarities, in which the magnetic field created has zones where its action is nil.

In conditions where the magnets are arranged with alternate polarities the movable ring in the state of rest is magnetized in sectors according to the polarities induced by the pairs of poles situated before each sector.

When the movable ring takes up its normal rotary motion, it transfers during that motion each already magnetized sector from a concordant field to a discordant field, and thus a resistant force arises which is as much greater as the magnetic field generated is greater.

Immovable pole pieces can be located between the ring and the magnets, or electromagnets, to vary the resistant force and the magnets are fitted to a movable holder on a plane parallel to the plane of the movable ring.

By rotating the magnet holder it is possible to obtain any division of the magnetic field and thus to obtain the desired braking force.

So as to enhance the braking action, the invention envisages as a variant an interference with the magnetic field on the cage as well. Such an interference can be obtained by coupling to the cage one or more suitably arranged metallic elements.

In a ring spinning frame equipped with a considerable number of rotatable rings it is necessary to be able to arrange quickly and in an identical manner the tensioning at each spinning position and also to retain the ability to take action on each ring independently.

To obtain this it is enough to connect the magnet holders to a suitable system of leverages, which causes the same displacement of these holders at each position, and to retain the ability to disconnect each individual lever so that it can be worked by hand for individual actions to be taken at each specific position.

The invention is therefore embodied with an isostatic bearing to provide rolling and support with revolvable bodies which comprises an inner ring, an outer ring, a cage and three revolvable bodies fitted substantially at angles of one hundred and twenty degrees from each other, in which bearing the revolvable bodies are kept in position by the cage, the mean circumference of which is offset in relation to the median circumference of rolling of the revolvable bodies, and one ring is substantially stiff and the other ring is resilient with a suitable degree of contact with the revolvable bodies so that, after being fitted, the resilient ring tends to take up a three-lobed conformation, thus providing a pre-set pre-load for the revolvable bodies.

The invention is also embodied with a device comprising adjustable braking means and capable of being used as a rotatable ring.

Let us now see an illustrative but not restrictive embodiment of the invention with reference to the attached figures.

In the figures we have the following:

FIGS. 1a and 1b show a vertical section of two possible variants of the bearing of the invention;

FIG. 2 gives a vertical section of the bearing of FIG. 1a employed as a rotatable ring;

FIG. 3 gives a horizontal section of a possible lubrication application;

FIG. 4 shows a horizontal section of an embodiment of the braking system;

FIG. 5 gives a variant of FIG. 4;

Figure 1A:
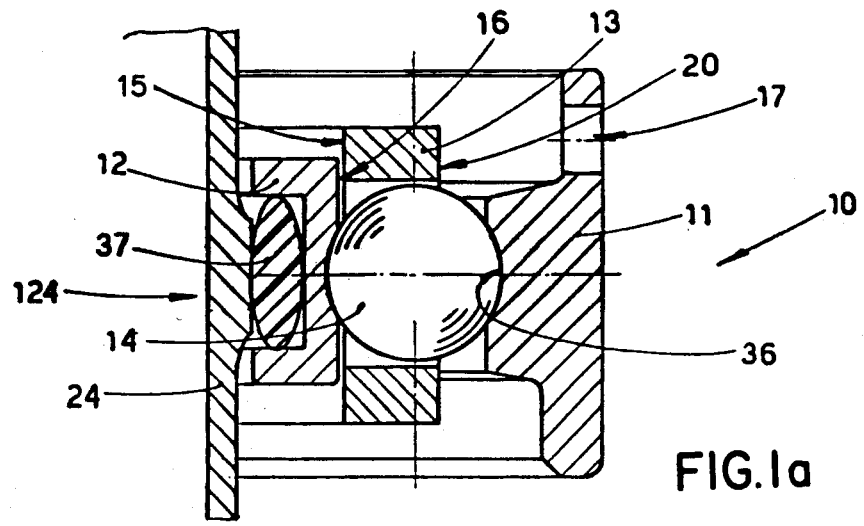
Figure 2:
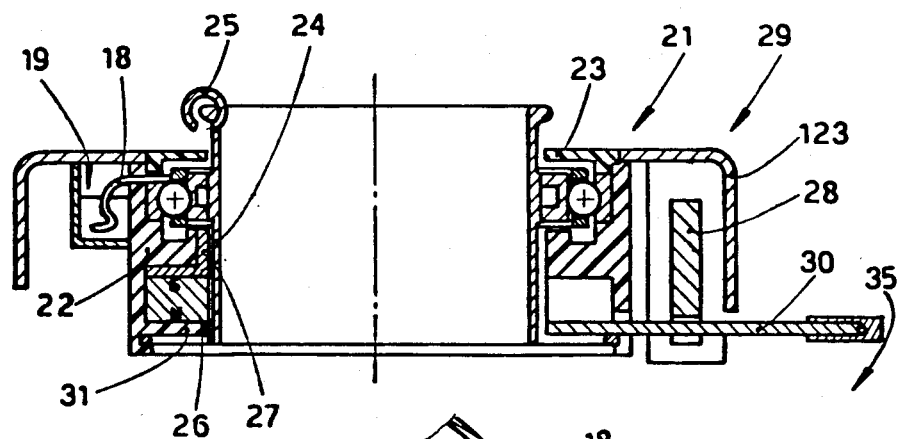
Figure 3:
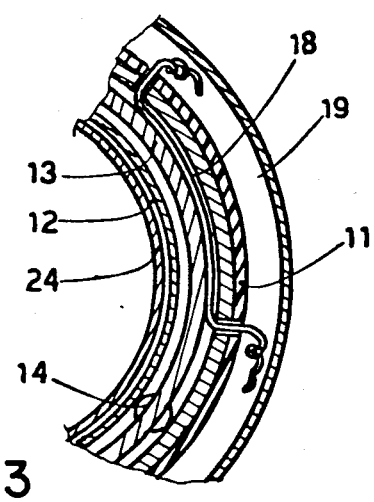

With reference to the figures, in the example shown an outer ring 11 of a bearing 10 is embodied as being stiff, whereas an inner ring 12 is embodied as being resilient.

This embodiment is specifically intended for application of the device to rotatable spinning rings. In the example shown the inner ring 12 has a C-shaped section but could have any other section suitable for the purpose as in FIG. 7 or still others.

The configuration of the outer ring 11 will be such as to give the necessary stiffness and the required capability of installation.

According to the invention the bearing 10 comprises three revolvable bodies 14 situated at angles of one hundred and twenty degrees along the circumference, and the inner diameter of their trajectory is slightly smaller than the diameter of the innermost part of a groove on a face 16 of the inner ring 12. The result is that there is contact during installation; this contact will be according to the design made and will therefore produce a suitable radial load on the revolvable bodies 14.

This contact causes the ring 12, after being installed, to take up a three-lobed shape continuously.

The revolvable bodies 14 are kept in position by a cage 13 which is situated advantageously offset inwards in relation to the bodies 14, the inner ring 12 being the resilient ring. In the example shown a face 15 of the cage 13 is, therefore, near a face 16, although the two faces may touch each other at random during working.

The outer ring 11 comprises two or more holes 17 through which a wick 18 passes; the wick 18 is stretched between the holes 17 and picks up oil from an oil bath 19 and brushes against a face 20 of the cage 13 suitably.

The wick 18 in FIG. 1b can preferably, but not essentially, also cooperate with discharge grooves 136 if rollers 114 are comprised (but this embodiment can also be applied to balls 14).

The wick 18 feeds lubricating oil by capillary action to the face 20 of the cage 13, whence the oil reaches the revolvable bodies 14, or the wick 18 feeds oil directly to the revolvable bodies 14 themselves, which are thus always lubricated, a metal-to-metal contact being prevented in this way. The lubrication will advantageously be of a type called minimal.

The cage 13 has the advantage that it can be made in one single piece of great dimensional accuracy and advantageously of a thermosetting material possibly reinforced with another material suitable for the purpose.

When the bearing 10 is employed as a rotatable ring 21 for spinning operations, it will be fitted to a suitable support 22 which comprises appropriate seatings. The support 22 will also provide suitable shields 23-123.

An appropriate sleeve 24 is fitted in cooperation with the inner ring 12 and comprises a suitable anchorage seating for a small ring 25.

The sleeve 24 can have an appropriate swelling 124 for better anchorage to the inner ring 12. This anchorage is obtained advantageously with a damping and coupling ring 37 interposed.

So as to be able to bring about the desired braking action, the invention provides a plurality of permanent magnets or electromagnets 26 fitted alongside one another with their polarities advantageously, but not necessarily, reversed in relation to each other, in which case the magnets 26 will be in an even number.

To make the action of braking more capable of being graduated, metallic pole pieces 27 are envisaged which are able to transfer the magnetic action from the magnets 26 to the inner ring 12.

If the magnets 26 stayed still in relation to the pole pieces 27, a plurality of stationary magnetic fields would remain acting on the inner ring 12 even if the ring 12 was rotating. This would create a maximum, constant braking action due to interference between the stationary magnetic field created by two neighbouring pole pieces 27 of differing polarities and the temporary magnetization localized in the rotatable ring 12 by the two preceding pairs of pole pieces 27.

But if the magnets 26 are displaced in relation to the pole pieces 27 (or viceversa), magnetic fields of a varying value, depending on the reciprocal positions of the magnets 26 and pole pieces 27, are created on the rotatable ring 12.

The displacement of the magnets 26 (here we have taken the case where the magnets 26 and not the pole pieces 27 are displaced) can be carried out by angular rotation (FIG. 4), or by radial displacement (not shown), or by angular displacement on an inclined arm (FIG. 5) through cooperation of movable pins 33 with substantially stationary slots 34, the magnets 26 being rotated on a pivot or axis of pivoting 32.

Each of these systems can be actuated by one single centralized device 28 that controls all the rotatable rings 21 fitted to a ring rail 29.

In the example of FIG. 4 a shaft 28 is moved axially and acts on a lever 30 which rotates a support 31 that bears the magnets 26.

The lever 30 can be detached from the shaft 28 by a lowering action 35 so as to be able to act on each rotatable ring 21 individually.

In the example of FIG. 5 the magnet 26 pivots at 32 and the pin 33 cooperates with an appropriate slot 34 comprised in the support 31, so that the magnet 26 is made to rotate around the pivot 32.

It is implicit that, when electromagnets are fitted and it is wished to change their braking action, this can be done by acting on the supply current.

Figure 6A:
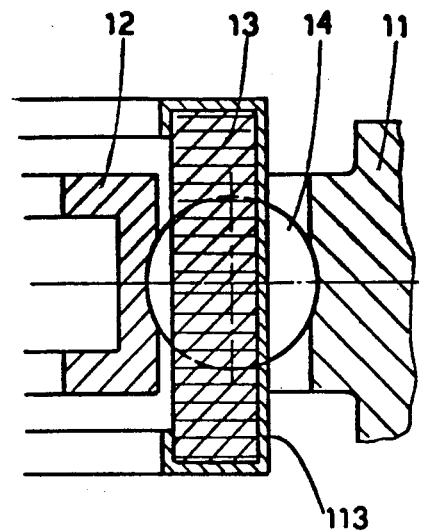
FIGS. 6a and 6b show a possible extension of the braking effect to the cage.

According to a variant the action of the magnets 26 or of the pole pieces 27 can also act on the cage 13 (FIG. 6a) if the cage 13 comprises one or more metallic means 113 sensitive to magnets.

Figure 6B:
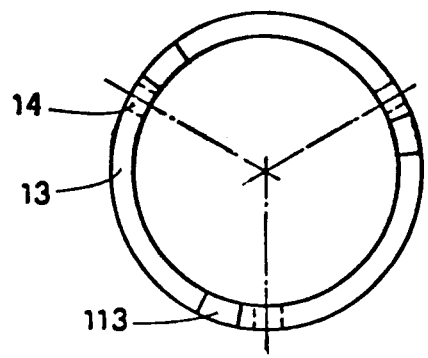
Figure 7A:
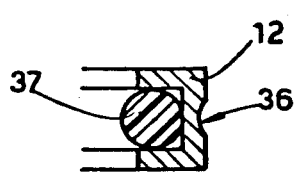
FIGS. 7a-7h show some examples of inner rings.
Figure 7B:
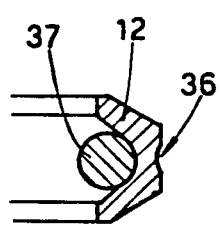
Figure 7C:
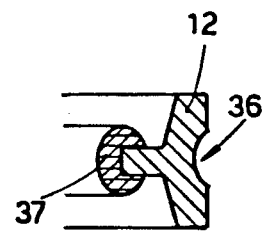
Figure 7D:
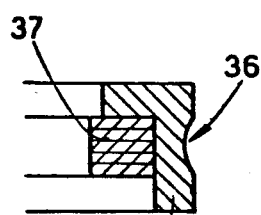
Figure 7E:
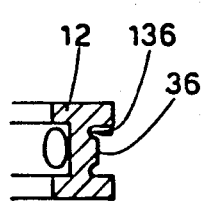
Figure 7F:
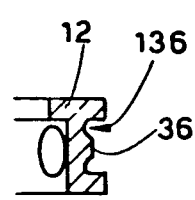
Figure 7G:
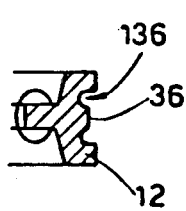
Figure 7H:
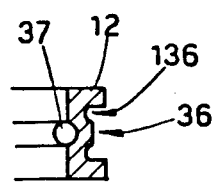

The example of FIG. 6b shows three clips 113 cooperating with the cage 13 near the revolvable bodies 14.

We claim:

1. An isostatic bearing to provide rolling and support with revolvable bodies comprising
    an inner ring,
    an outer ring,
    a cage, and
    three revolvable bodies fitted substantially at angles of one hundred and twenty degrees from each other, wherein said revolvable bodies are kept in position by said cage, the mean circumference of which is offset in relation to the median circumference of rolling of said revolvable bodies, and one of said inner and outer rings is substantially stiff and the other of said inner and outer rings is resilient with a suitable degree of contact with said revolvable bodies so that, after being fitted, the resilient ring takes up a three-lobed conformation, thus providing a pre-set pre-load for said revolvable bodies.

2. The isostatic bearing of claim 1, wherein said mean circumference of said cage is offset towards said resilient ring.

3. The isostatic bearing of claim 1, wherein said resilient ring has enough crosswise stiffness to prevent warping and crosswise deformation.

4. The isostatic bearing of claim 1, wherein the substantially stiff ring includes at least two holes cooperating with a wick that stretches between and through said at least two holes and picks up lubricant in a bath and at least brushes against a face of said cage.

5. The isostatic bearing of claim 1, wherein the substantially stiff ring includes at least one hole through which a wick passes and picks up lubricant in a bath and cooperates with the neighborhood of a race.

6. The isostatic bearing of claim 5, wherein said wick provides minimal lubrication.

7. The isostatic bearing of claim 6, wherein pole pieces cooperate with the resiliant ring and along the circumference thereof, on which there act an even number of magnets arranged advantageously with alternate polarities, the action of said magnets being capable of being varied suitably.

8. The isostatic bearing of claim 7, wherein the variable action of said magnets is obtained by a reciprocal circumferential displacement of the positions of said magnet and pole piece.

9. The isostatic bearing of claim 8, wherein the variable action of said magnets is obtained by varying the supply current thereto.

10. The isostatic bearing of claim 1, further comprising a ring rail fitted thereto and cooperating with a sleeve that bears a small ring and which has the function of a rotatable ring.

11. The isostatic bearing of claim 10, further comprising a damping and coupling ring located between said sleeve and said inner ring and said sleeve and said inner ring both rotate at the same speed.

12. The isostatic bearing of claim 1, wherein said resilient ring is the outer ring.

13. The isostatic bearing of claim 1, wherein said resilient ring is the inner ring.

14. The isostatic bearing of claim 1, wherein said resilient ring is the rotatable ring.

15. The isostatic bearing of claim 1, further comprising at least one metallic means sensitive to magnets positioned on said cage.

* * * * *